US010988015B2

(12) United States Patent
Gutierrez

(10) Patent No.: US 10,988,015 B2
(45) Date of Patent: Apr. 27, 2021

(54) MULTI-POSITION MOUNT SYSTEM

(71) Applicant: GM GLOBAL TECHNOLOGY OPERATIONS LLC, Detroit, MI (US)

(72) Inventor: Michael A. Gutierrez, Dearborn Heights, MI (US)

(73) Assignee: GM Global Technology Operations LLC, Detroit, MI (US)

(*) Notice: Subject to any disclaimer, the term of this patent is extended or adjusted under 35 U.S.C. 154(b) by 354 days.

(21) Appl. No.: 16/211,591

(22) Filed: Dec. 6, 2018

(65) Prior Publication Data
US 2020/0180418 A1 Jun. 11, 2020

(51) Int. Cl.
| | | |
|---|---|---|
| *B60K 5/12* | (2006.01) | |
| *F16F 1/38* | (2006.01) | |
| *F16F 1/52* | (2006.01) | |
| *F02F 7/00* | (2006.01) | |

(52) U.S. Cl.
CPC .......... *B60K 5/1208* (2013.01); *F02F 7/0082* (2013.01); *F16F 1/3849* (2013.01); *F16F 1/52* (2013.01); *F16F 2224/025* (2013.01); *F16F 2230/36* (2013.01)

(58) Field of Classification Search
CPC ....... B60K 5/1208; B60K 5/1283; F16F 1/52; F16F 1/3849; F16F 2224/025; F16F 2230/36; F02F 7/0082
USPC .................................................... 267/140.11
See application file for complete search history.

(56) References Cited

U.S. PATENT DOCUMENTS

| | | | | |
|---|---|---|---|---|
| 2,706,126 | A * | 4/1955 | Thiry ...................... | F16F 1/545 403/225 |
| 4,966,472 | A * | 10/1990 | Link ...................... | B60G 11/12 384/474 |
| 5,330,164 | A * | 7/1994 | Takano ................... | F16F 1/387 267/140.14 |
| 6,349,918 | B1 * | 2/2002 | Bunker ................ | B60K 5/1208 248/635 |
| 6,428,645 | B1 * | 8/2002 | Rau .......................... | C08J 5/128 156/151 |
| 6,450,474 | B1 * | 9/2002 | Bucksbee ............ | B60K 5/1208 248/560 |
| 9,933,038 | B2 * | 4/2018 | Kojima ................... | F16F 13/10 |
| 10,337,585 | B2 * | 7/2019 | Kojima ................... | F16F 1/371 |
| 10,619,691 | B2 * | 4/2020 | Scharf ................... | F16F 1/3849 |
| 10,870,342 | B2 * | 12/2020 | Takakura ................. | B60K 5/12 |

(Continued)

*Primary Examiner* — Bradley T King
*Assistant Examiner* — James K Hsiao
(74) *Attorney, Agent, or Firm* — Quinn IP Law

(57) ABSTRACT

An exemplary multi-position mount system for a powertrain component includes a mount assembly including a mount housing having a first mount edge defining a rectangular mount opening with at least two mount notch openings on each side of the rectangular mount opening, a sleeve insert having at least two insert tabs extending from each side of the insert, the insert having an insert opening with at least two insert notch openings on each side of the insert opening, a damping assembly including an alignment tab extending from each side of the damper body, and a T-bracket including a T-bracket sleeve having an edge defining an offset opening in the T-bracket sleeve. The sleeve insert interfaces with the mount housing and is rotatable within the mount opening, the damping assembly is rotatable within the insert opening, and the insert opening is spaced apart from the mount opening.

15 Claims, 2 Drawing Sheets

(56) References Cited

U.S. PATENT DOCUMENTS

| | | | | |
|---|---|---|---|---|
| 2003/0214085 | A1* | 11/2003 | Makino | F16F 1/3849 267/140.12 |
| 2008/0173783 | A1* | 7/2008 | Bunker | F16F 1/377 248/634 |
| 2012/0146271 | A1* | 6/2012 | Kato | B29C 33/005 267/293 |
| 2014/0159290 | A1* | 6/2014 | Kojima | F16F 13/18 267/140.13 |
| 2015/0129742 | A1* | 5/2015 | Okanaka | F16F 15/08 248/634 |
| 2015/0184717 | A1* | 7/2015 | Kojima | F16F 13/107 267/140.11 |
| 2015/0276010 | A1* | 10/2015 | Nakamura | F16F 13/108 248/634 |
| 2016/0116018 | A1* | 4/2016 | Yoshii | F16F 1/371 267/141 |
| 2016/0238102 | A1* | 8/2016 | Goto | F16F 13/08 |
| 2017/0299007 | A1* | 10/2017 | Scharf | F16F 1/3849 |
| 2017/0299013 | A1* | 10/2017 | Kojima | F16F 3/0873 |
| 2017/0335920 | A1* | 11/2017 | Kanaya | F16F 13/103 |
| 2017/0341500 | A1* | 11/2017 | Oki | F16F 1/3605 |
| 2017/0355256 | A1* | 12/2017 | Lamm | F16F 1/3863 |
| 2018/0229595 | A1* | 8/2018 | Hatano | F16F 3/12 |
| 2019/0003552 | A1* | 1/2019 | Iraki | F16F 1/3863 |
| 2019/0154097 | A1* | 5/2019 | Lee | F16H 57/025 |

* cited by examiner

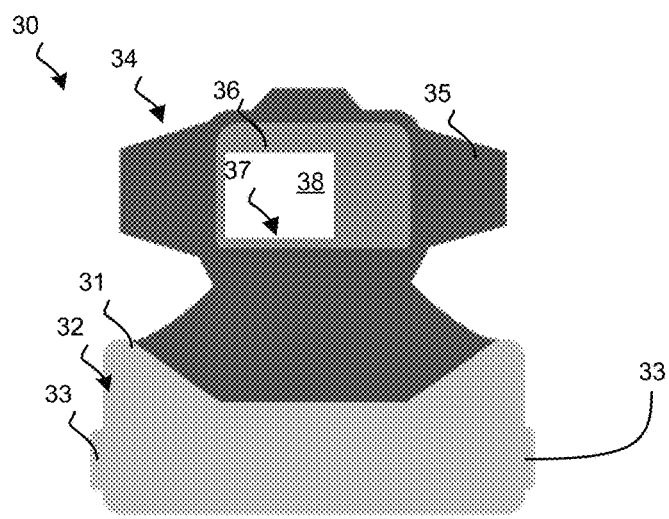
FIG. 3
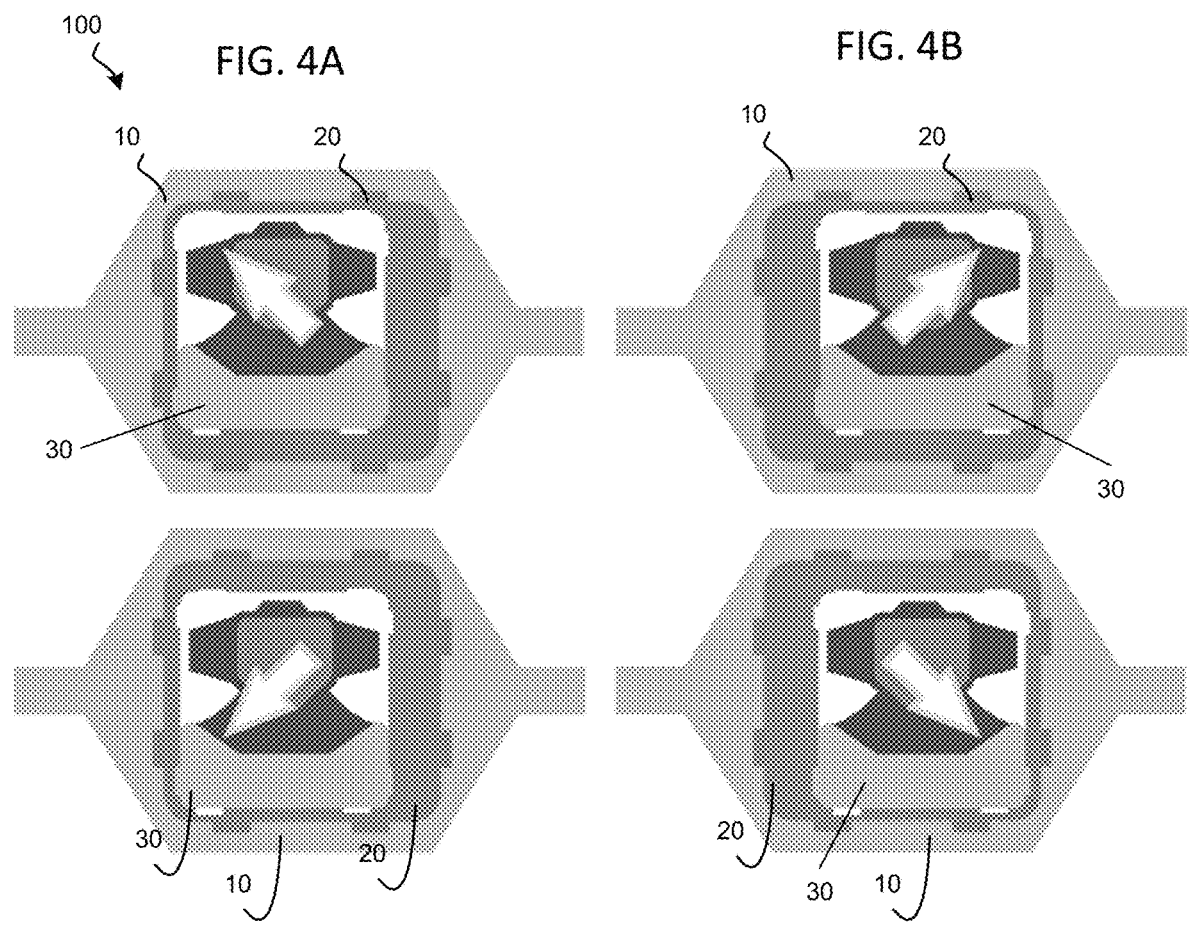

MULTI-POSITION MOUNT SYSTEM

INTRODUCTION

The present invention relates generally to mounting systems and, more specifically, to a mount system that permits multiple unique mounting positions within a single mount housing.

Vehicle powertrain assemblies often require several mount positions or orientations to accommodate variation in torque roll axes across the powertrain assemblies for various vehicle configurations. To satisfy these requirements, several different mounting systems, including different mount housings may be needed, increasing assembly complexity.

SUMMARY

Embodiments according to the present disclosure provide a number of advantages. For example, embodiments according to the present disclosure enable use of a single mount housing with a sleeve insert to provide multiple mounting positions for a main rubber element assembly component having a base plate or hydraulic unit.

In one aspect, a multi-position mount system for a powertrain component includes a mount assembly including a mount housing, the mount housing having a first mount edge defining a rectangular mount opening, the first mount edge including a plurality of mount notch openings, a sleeve insert including an insert body having a first side, a second side, a third side, and a fourth side such that that the insert body forms a rectangle, the insert body having an insert edge and an exterior edge spaced apart from the insert edge, the exterior edge including a plurality of insert tabs extending from the exterior edge, the insert edge defining a rectangular insert opening, the first insert edge including a plurality of insert notch openings, and a damping assembly including a damper body, the damper body having an exterior edge including a plurality of alignment tabs. In some aspects, the sleeve insert interfaces with the mount opening such that the plurality of insert tabs interface with the plurality of mount notch openings, the sleeve insert is rotatable within the mount opening, the damping assembly interfaces with the insert opening such that the plurality of alignment tabs interface with the plurality of insert notch openings, and a center of the insert opening is spaced apart from a center of the mount opening.

In some aspects, the first mount edge includes two mount notch openings on each side of the rectangular mount opening.

In some aspects, a spacing between the mount notch openings on one side of the rectangular mount opening is the same as the spacing between the mount notch openings on each of the other sides of the rectangular mount opening.

In some aspects, the first side of the insert body has a first width, the second side of the insert body has a second width, the third side of the insert body has a third width, and the fourth side of the insert body has a fourth width and the first width is larger than each of the second, third, and fourth widths.

In some aspects, the second width is larger than the third and fourth widths.

In some aspects, the third width is larger than the fourth width.

In some aspects, the insert edge includes two insert notch openings on each side of the rectangular insert opening.

In some aspects, the damping assembly includes a T-bracket having a T-bracket body and a T-bracket sleeve, the T-bracket sleeve including an edge defining an offset opening such that as the damping assembly is rotated relative to the mount housing, the T-bracket sleeve opening also rotates relative to the mount housing.

In another aspect, a multi-position mount system for a powertrain component includes a mount assembly including a mount housing, the mount housing having a first mount edge defining a rectangular mount opening, the first mount edge including at least one mount notch opening on each side of the rectangular mount opening, a sleeve insert including an insert body having a first side, a second side, a third side, and a fourth side, the insert body having an insert edge and an exterior edge spaced apart from the insert edge, the exterior edge including at least one insert tab extending from the exterior edge on each of the first, second, third, and fourth sides of the insert body, the insert edge defining a rectangular insert opening, the insert edge including at least one insert notch opening on each of the first, second, third, and fourth sides of the rectangular insert opening, a damping assembly including a damper body, the damper body having an exterior edge including at least one alignment tab, and a T-bracket including a T-bracket body and a T-bracket sleeve, the T-bracket sleeve including an edge defining an offset opening in the T-bracket sleeve. In some aspects, the sleeve insert interfaces with the mount opening such that the at least one insert tab interfaces with the at least one mount notch opening such that the sleeve insert is rotatable within the mount opening, the damping assembly interfaces with the insert opening such that the at least one alignment tab interfaces with the at least one insert notch opening such that the damping assembly is rotatable within the insert opening, and a center of the insert opening is spaced apart from a center of the mount opening.

In some aspects, the first mount edge includes two mount notch openings on each side of the rectangular mount opening.

In some aspects, a spacing between the mount notch openings on one side of the rectangular mount opening is the same as the spacing between the mount notch openings on each of the other sides of the rectangular mount opening.

In some aspects, the first side of the insert body has a first width, the second side of the insert body has a second width, the third side of the insert body has a third width, and the fourth side of the insert body has a fourth width and the first width is larger than each of the second, third, and fourth widths.

In some aspects, the insert edge includes two insert notch openings on each side of the rectangular insert opening.

In yet another aspect, a multi-position mount system for a powertrain component includes a mount assembly including a mount housing, the mount housing having a first mount edge defining a rectangular mount opening, the first mount edge including two mount notch openings on each side of the rectangular mount opening, a sleeve insert including a rectangular insert body, the insert body having an insert edge and an exterior edge spaced apart from the insert edge, the exterior edge including two insert tabs extending from the exterior edge on each side of the insert body, the insert edge defining a rectangular insert opening, the insert edge including two insert notch openings on each side of the rectangular insert opening, a damping assembly including a damper body, the damper body having an exterior edge including a first alignment tab extending from one side of the damper body and a second alignment tab extending for a second side of the damper body opposite the first side, and a T-bracket including a T-bracket body and a T-bracket sleeve, the T-bracket sleeve including an edge defining an offset opening in the T-bracket sleeve. In some aspects, the insert tabs are aligned with the mount notch openings such that the sleeve insert interfaces with the mount housing and is rotatable within the mount opening, the alignment tabs are aligned with the insert notch openings such that the damping assembly is rotatable within the insert opening, and a center of the insert opening is spaced apart from a center of the mount opening.

In some aspects, the insert opening is offset from the mount opening.

BRIEF DESCRIPTION OF THE DRAWINGS

The present disclosure will be described in conjunction with the following figures, wherein like numerals denote like elements.

FIG. 3 is a schematic illustration of a main rubber element assembly for a multi-position mount system, according to an embodiment.

FIGS. 4A-D depict a sequence of schematic illustrations showing various positions of a multi-position mount system, according to an embodiment.

Figure 1:
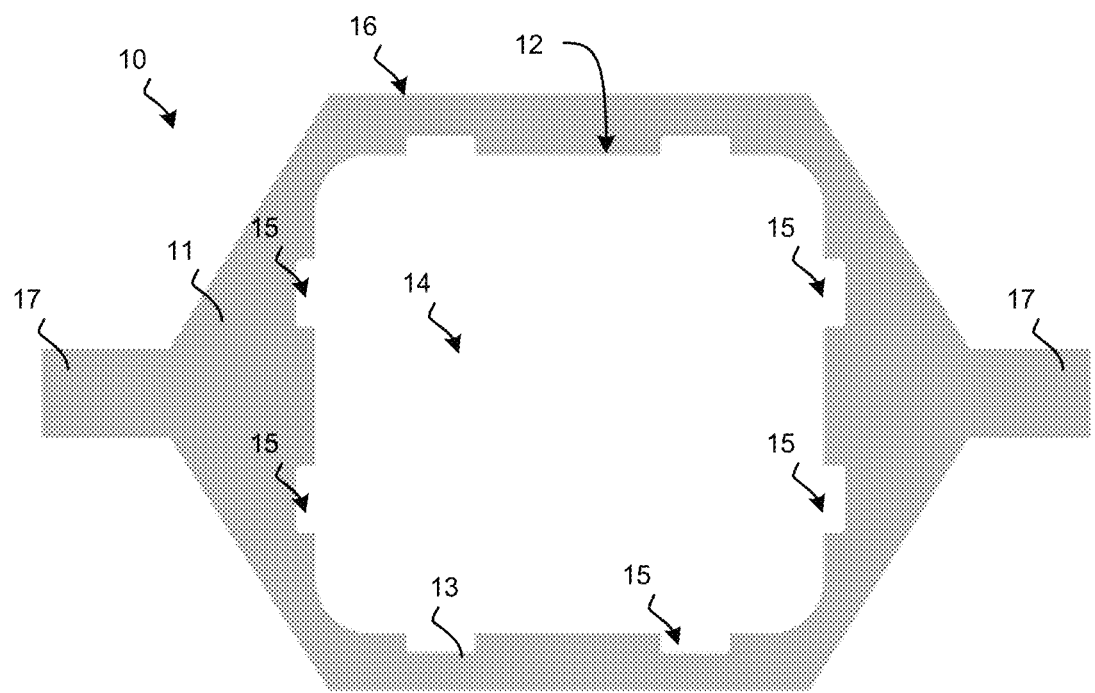
FIG. 1 is a schematic illustration of a mount housing for a multi-position mount system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be. For example, terms such as "above" and "below" refer to directions in the drawings to which reference is made. Terms such as "front," "back," "Left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

In various embodiments, a multi-position mount system includes a sleeve insert placed between the mount housing and the main rubber element (MRE) assembly used to provide damping effects for a vehicle powertrain component. The interfaces between the sleeve insert and the mount housing and the sleeve insert and the MRE assembly allow the MRE assembly to be mounted in one four unique positions using a single mount housing.

FIG. 1 illustrates a mount assembly 10 for a multi-position mount, according to an embodiment. The mount assembly 10 includes a mount housing 11. The mount housing 11 has a first mount edge 12 defining a rectangular mount opening 14. In some embodiments, the first mount edge 12 includes a plurality of mount notch edges 13 that define a plurality of mount notch openings 15. In some embodiments, the first mount edge 12 includes two (2) mount notch openings 15 on each side of the rectangular opening 14. In some embodiments, the first mount edge 12 includes one, three, four, or more mount notch openings 15 on each side of the rectangular opening 14. In some embodiments, the spacing between the mount notch openings 15 on one side of the rectangular opening 14 is the same as the spacing between the mount notch openings 15 on each of the other sides of the rectangular opening 14. In some embodiments, an exterior surface 16 of the housing 11 includes extension members 17 that are configured to attach the mount system to the powertrain assembly.

Figure 2:
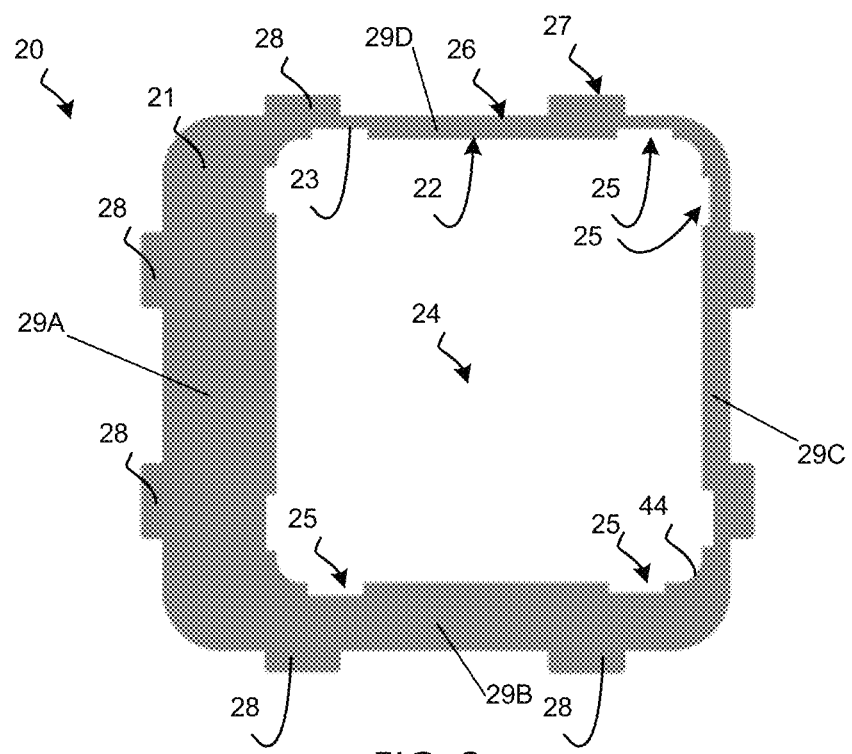
FIG. 2 is a schematic illustration of a sleeve insert for a multi-position mount system, according to an embodiment.

With reference to FIG. 2, the mount system includes a sleeve insert 20. In some embodiments, the sleeve insert 20 includes an insert body 21. The insert body 21 has a first side 29A, a second side 29B, a third side 29C, and a fourth side 29D such that that the insert body 21 forms a rectangle. The first side 29A has a first width, the second side 29B has a second width, the third side 29C has a third width, and the fourth side 29D has a fourth width. In some embodiments, the first width is larger than each of the second, third, and fourth widths. In some embodiments, the second width is larger than the third and fourth widths. In some embodiments, the third width is larger than the fourth width. In some embodiments, the third and fourth widths are approximately the same.

The insert body 21 has an insert edge 22 and an exterior edge 26 spaced apart from the insert edge 22. In some embodiments, the insert edge 22 defines a rectangular insert opening 24. The center of the rectangular insert opening 24 is offset from the axial center of the insert body 21 and offset from the mount opening 14 due to the variation in widths of the sides of the insert body 21. As discussed in greater detail with respect to FIGS. 4A-4D, when the sleeve insert 20 is rotated within the mount assembly 10, the offset orientation of the insert opening 24 permits multiple positions of a main rubber element assembly to accommodate various powertrain architectures using a single mount system.

Additionally, in some embodiments, the insert edge 22 includes a plurality of insert notch edges 23 that define a plurality of insert notch openings 25. In some embodiments, the insert edge 22 includes two (2) insert notch openings 25 on each side of the rectangular opening 24. In some embodiments, the insert edge 22 includes one, three, four, or more insert notch openings 25 on each side of the rectangular opening 24. In some embodiments, the spacing between the insert notch openings 25 on one side of the rectangular opening 24 is the same as the spacing between the insert notch openings 25 on each of the other sides of the rectangular opening 24.

In some embodiments, the exterior edge 26 includes a plurality of insert tab edges 27 that define a plurality of insert tabs 28 extending from the exterior edge 26. In some embodiments, the exterior edge 26 includes two (2) insert tabs 28 extending from each side of the insert body 21. In some embodiments, the exterior edge 26 includes one, three, four, or more insert tabs 28 on each side of the rectangular insert body 21. In some embodiments, the spacing between the insert tabs 28 located on one side of the insert body 21 is the same as the spacing between the insert tabs 28 on each of the other sides of the insert body 21. The insert tabs 28 interface with the mount notch openings 15 of the mount assembly 10. In some embodiments, the sleeve insert 20 may be press-fit within the mount opening 14 such that friction retains the sleeve insert 20 with the mount assembly 10. In other embodiments, other coupling means such as adhesive are used to couple the sleeve insert 20 to the mount assembly 10. In some embodiments, the sleeve insert 20 includes a groove formed in the insert edge 23 to aid with assembly of the sleeve insert FIG. 3 illustrates a damping assembly 30 for a multi-position mount system. The damping assembly 30 includes a damper body 31. The damper body 31 has an exterior edge 32 including a plurality of alignment tabs 33. In some embodiments, the damper body 31 includes two (2) alignment tabs 33 extending from opposite side of the damper body 31. The alignment tabs 33 interface with the insert notch openings 25 of the sleeve insert 20 to secure the MRE assembly 30 within the mount assembly 10. In some embodiments, the damping assembly 30 is a main rubber element (MRE) assembly consisting of a main rubber element and a bonding plate body. In some embodiments, the damping assembly 30 is a hydraulic damping assembly for a hydraulic mount.

In some embodiments, the damper body 31 is coupled to a T-bracket 34. The T-bracket 34 includes a T-bracket body 35 and a T-bracket sleeve 36. An edge 37 in the T-bracket sleeve 36 defines an opening 38 in the T-bracket sleeve 36. In some embodiments, the opening 38 is offset from the axial center of the T-bracket such that as the damping assembly 30 is rotated relative to the mount housing, the T-bracket sleeve opening 38 also rotates relative to the mount housing. In this embodiment, a common T-bracket can be used for powertrain assemblies in which a single transmission is used with multiple engines or vice versa.

FIGS. 4A-D illustrate a sequence of positions of a multi-position mount system 100 that includes the mount assembly 10, sleeve insert 20, and MRE assembly 30 discussed herein. As shown, the sleeve insert 20 interfaces with the mount opening 14 such that the plurality of insert tabs 28 interface with the plurality of mount notch openings 15. The sleeve insert 20 is rotatable within the mount opening 14 of the mount assembly 10. The sleeve insert 20 may be rotated 90, 180, 270, or 360 degrees within the opening 14 such that the insert opening 24 is oriented in four distinct positions relative to the mount assembly 10. As shown, the center of the insert opening 24 is spaced apart from the center of the mount opening 14, that is, the center of the insert opening 24 is not co-axial with the center of the mount opening 14. As the position of the insert opening 24 changes based on the orientation of the sleeve insert 20 relative to the mount assembly 10, the position of the MRE assembly 30 may be oriented to the upper left (FIG. 4A), the upper right (FIG. 4B), the lower left (FIG. 4C), or the lower right (FIG. 4D). The positional variation afforded by the rotatable sleeve insert allows the mount system 100 to accommodate the mass and inertia variations across a vehicle architecture's powertrain lineup using a single mount system.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, hut that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A multi-position mount system for a powertrain component, comprising:
   a mount assembly comprising a mount housing, the mount housing having a first mount edge defining a rectangular mount opening, the first mount edge comprising a plurality of mount notch openings;
   a sleeve insert comprising an insert body having a first side, a second side, a third side, and a fourth side such that that the insert body forms a rectangle, the insert body having an insert edge and an exterior edge spaced apart from the insert edge, the exterior edge comprising a plurality of insert tabs extending from the exterior edge, the insert edge defining a rectangular insert opening, the first insert edge comprising a plurality of insert notch openings; and
   a damping assembly comprising a damper body, the damper body having an exterior edge comprising a plurality of alignment tabs;
   wherein the sleeve insert interfaces with the mount opening such that the plurality of insert tabs interface with the plurality of mount notch openings, the sleeve insert is rotatable within the mount opening, the damping assembly interfaces with the insert opening such that the plurality of alignment tabs interface with the plurality of insert notch openings, and a center of the insert opening is spaced apart from a center of the mount opening.

2. The mount system of claim 1, wherein the first mount edge comprises two mount notch openings on each side of the rectangular mount opening.

3. The mount system of claim 2, wherein a spacing between the mount notch openings on one side of the rectangular mount opening is the same as the spacing between the mount notch openings on each of the other sides of the rectangular mount opening.

4. The mount system of claim 1, wherein the first side of the insert body has a first width, the second side of the insert body has a second width, the third side of the insert body has a third width, and the fourth side of the insert body has a fourth width and the first width is larger than each of the second, third, and fourth widths.

5. The mount system of claim 4, wherein the second width is larger than the third and fourth widths.

6. The mount system of claim 5, wherein the third width is larger than the fourth width.

7. The mount system of claim 1, wherein the insert edge comprises two insert notch openings on each side of the rectangular insert opening.

8. The mount system of claim 1, wherein the damping assembly comprises a T-bracket having a T-bracket body and a T-bracket sleeve, the T-bracket sleeve including an edge defining an offset opening such that as the damping assembly is rotated relative to the mount housing, the T-bracket sleeve opening also rotates relative to the mount housing.

9. A multi-position mount system for a powertrain component, comprising:
   a mount assembly comprising a mount housing, the mount housing having a first mount edge defining a rectangular mount opening, the first mount edge comprising at least one mount notch opening on each side of the rectangular mount opening;
   a sleeve insert comprising an insert body having a first side, a second side, a third side, and a fourth side, the insert body having an insert edge and an exterior edge spaced apart from the insert edge, the exterior edge comprising at least one insert tab extending from the exterior edge on each of the first, second, third, and fourth sides of the insert body, the insert edge defining a rectangular insert opening, the insert edge comprising at least one insert notch opening on each of the first, second, third, and fourth sides of the rectangular insert opening;
   a damping assembly comprising a damper body, the damper body having an exterior edge comprising at least one alignment tab; and
   a T-bracket comprising a T-bracket body and a T-bracket sleeve, the T-bracket sleeve including an edge defining an offset opening in the T-bracket sleeve;
   wherein the sleeve insert interfaces with the mount opening such that the at least one insert tab interfaces with the at least one mount notch opening such that the sleeve insert is rotatable within the mount opening, the damping assembly interfaces with the insert opening such that the at least one alignment tab interfaces with the at least one insert notch opening such that the damping assembly is rotatable within the insert opening, and a center of the insert opening is spaced apart from a center of the mount opening.

10. The mount system of claim 9, wherein the first mount edge comprises two mount notch openings on each side of the rectangular mount opening.

11. The mount system of claim 10, wherein a spacing between the mount notch openings on one side of the rectangular mount opening is the same as the spacing between the mount notch openings on each of the other sides of the rectangular mount opening.

12. The mount system of claim 9, wherein the first side of the insert body has a first width, the second side of the insert body has a second width, the third side of the insert body has a third width, and the fourth side of the insert body has a fourth width and the first width is larger than each of the second, third, and fourth widths.

13. The mount system of claim 9, wherein the insert edge comprises two insert notch openings on each side of the rectangular insert opening.

14. A multi-position mount system for a powertrain component, comprising:
- a mount assembly comprising a mount housing, the mount housing having a first mount edge defining a rectangular mount opening, the first mount edge comprising two mount notch openings on each side of the rectangular mount opening;
- a sleeve insert comprising a rectangular insert body, the insert body having an insert edge and an exterior edge spaced apart from the insert edge, the exterior edge comprising two insert tabs extending from the exterior edge on each side of the insert body, the insert edge defining a rectangular insert opening, the insert edge comprising two insert notch openings on each side of the rectangular insert opening;
- a damping assembly comprising a damper body, the damper body having an exterior edge comprising a first alignment tab extending from one side of the damper body and a second alignment tab extending for a second side of the damper body opposite the first side; and
- a T-bracket comprising a T-bracket body and a T-bracket sleeve, the T-bracket sleeve including an edge defining an offset opening in the T-bracket sleeve;
- wherein the insert tabs are aligned with the mount notch openings such that the sleeve insert interfaces with the mount housing and is rotatable within the mount opening, the alignment tabs are aligned with the insert notch openings such that the damping assembly is rotatable within the insert opening, and a center of the insert opening is spaced apart from a center of the mount opening.

15. The mount system of claim 14, wherein the insert opening is offset from the mount opening.

* * * * *